United States Patent
Russell et al.

(10) Patent No.: US 12,166,789 B1
(45) Date of Patent: Dec. 10, 2024

(54) AUTOMATED NETWORK POLICY MANAGEMENT

(71) Applicant: United Services Automobile Association (USAA), San Antonio, TX (US)

(72) Inventors: Ryan Russell, San Antonio, TX (US); Thomas Francis Powers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 510 days.

(21) Appl. No.: 17/319,862

(22) Filed: May 13, 2021

Related U.S. Application Data

(63) Continuation of application No. 16/242,590, filed on Jan. 8, 2019, now Pat. No. 11,025,663.

(60) Provisional application No. 62/614,652, filed on Jan. 8, 2018.

(51) Int. Cl.
| | |
|---|---|
| *H04L 9/40* | (2022.01) |
| *G06N 20/00* | (2019.01) |
| *H04L 41/142* | (2022.01) |
| *H04L 41/22* | (2022.01) |
| *H04L 43/04* | (2022.01) |
| *H04L 43/062* | (2022.01) |

(52) U.S. Cl.
CPC ......... *H04L 63/1441* (2013.01); *G06N 20/00* (2019.01); *H04L 41/142* (2013.01); *H04L 41/22* (2013.01); *H04L 43/04* (2013.01); *H04L 43/062* (2013.01); *H04L 63/0236* (2013.01); *H04L 63/1425* (2013.01); *H04L 63/20* (2013.01)

(58) Field of Classification Search
CPC ... H04L 63/1441; H04L 41/142; H04L 41/22; H04L 43/04; H04L 43/062; H04L 63/0236; H04L 63/1425; H04L 63/20; G06N 20/00
See application file for complete search history.

(56) References Cited

U.S. PATENT DOCUMENTS

| | | |
|---|---|---|
| 5,557,748 A | 9/1996 | Norris |
| 6,029,201 A | 2/2000 | Neill |
| 6,175,860 B1 * | 1/2001 | Gaucher ............ H04L 12/2809 709/208 |
| 7,480,933 B2 | 1/2009 | Bush et al. |
| 7,536,450 B2 | 5/2009 | Motoyama et al. |
| 7,774,832 B2 | 8/2010 | Poling et al. |
| 8,046,823 B1 | 10/2011 | Begen et al. |

(Continued)

*Primary Examiner* — Abu S Sholeman
(74) *Attorney, Agent, or Firm* — BakerHostetler

(57) ABSTRACT

Systems, methods, and products are configured for receiving a request from a first electronic device to connect to a first network and determining an electronic communication protocol of the first electronic device. A database can be queried to identify a communication protocol restriction corresponding to the electronic communication protocol of the first electronic device and connecting the first electronic device to a subnetwork. Continuous monitoring of data traffic can be performed to identify data packets transmitted from the first electronic device to a second electronic device can be performed, and, upon identifying at least one data packet transmitted from the first electronic device to the second electronic device, the connection between the first electronic device and the second electronic device can be terminated.

18 Claims, 5 Drawing Sheets

(56) References Cited

U.S. PATENT DOCUMENTS

| | | | |
|---|---|---|---|
| 8,392,561 | B1 | 3/2013 | Dyer et al. |
| 10,044,729 | B1 | 8/2018 | Astakhova et al. |
| 10,055,729 | B2 | 8/2018 | Taveau et al. |
| 2002/0065924 | A1 | 5/2002 | Barrall et al. |
| 2005/0055398 | A1 | 3/2005 | Olson et al. |
| 2006/0155865 | A1* | 7/2006 | Brandt .................... H04L 69/16 709/230 |
| 2006/0227797 | A1 | 10/2006 | Chandika et al. |
| 2008/0196099 | A1 | 8/2008 | Shastri |
| 2009/0106401 | A1 | 4/2009 | Meng et al. |
| 2009/0119743 | A1* | 5/2009 | Werner ................ G06F 13/387 709/224 |
| 2009/0328186 | A1 | 12/2009 | Pollutro et al. |
| 2010/0165878 | A1 | 7/2010 | Soni |
| 2012/0266214 | A1* | 10/2012 | Hagiu .................... G06F 21/42 726/3 |
| 2013/0132545 | A1* | 5/2013 | Schultze ............... G06F 9/5077 709/223 |
| 2013/0185785 | A9 | 7/2013 | Mazarick et al. |
| 2013/0185786 | A1 | 7/2013 | Dyer et al. |
| 2013/0290564 | A1* | 10/2013 | Behle .................. H04L 61/5076 709/245 |
| 2014/0047113 | A1 | 2/2014 | Subramanya et al. |
| 2014/0074977 | A1 | 3/2014 | Niida |
| 2014/0181947 | A1 | 6/2014 | Lund |
| 2014/0289800 | A1 | 9/2014 | Huang et al. |
| 2015/0150098 | A1* | 5/2015 | Murphy ................ G16H 10/60 726/4 |
| 2016/0149792 | A1 | 5/2016 | Wang et al. |
| 2017/0134541 | A1 | 5/2017 | Xu et al. |
| 2020/0372156 | A1 | 11/2020 | Sayyed et al. |
| 2020/0380153 | A1 | 12/2020 | Mi et al. |
| 2020/0397387 | A1 | 12/2020 | Proksa |

\* cited by examiner

AUTOMATED NETWORK POLICY MANAGEMENT

CROSS-REFERENCE TO RELATED APPLICATIONS

This application claims priority to and is a continuation application of U.S. patent application Ser. No. 16/242,590, filed Jan. 8, 2019, which application claims priority to U.S. Provisional Patent Application Ser. No. 62/614,652, entitled "Automated Network Policy Management," filed Jan. 8, 2018, which is hereby incorporated by reference in its entirety.

TECHNICAL FIELD

This application relates generally to methods and systems for automated network policy management.

BACKGROUND

Network security management is important to prevent malicious attacks. However, conventional methods for securing networks and managing network policies may require significant time investment and technical expertise (e.g., network security management). For example, in some existing and conventional methods, a security specialist may install a firewall to establish a barrier between trusted network devices and untrusted network devices attempting to communicate with outside networks. However, setting up a firewall may require specialized knowledge regarding both software and hardware configurations. A user may need to understand the functions of different ports, the network security rules, the data traffic patterns of malicious attacks, and other related information to manage the firewall security protocols. In addition, the firewall logs may include a substantial amount of information and data that are not intuitive to read and digest for a user who is not familiar with computer science terminology. Thus, it may be difficult or impractical for users without specialized computer science training to manage their network security.

While large corporations and organizations may hire a team of information technology (IT) specialists for network security management, most small local area networks (e.g., home networks) may only have minimum security protection. For example, these users may not have the resources to hire IT professionals for their home network management. These users may be unable to configure the network policy for their home network based on customized requirements due to a lack of specialized computer science knowledge. A hacker may take advantage and break into these home networks. The hacker may control one of the electronic devices in the home networks without the network user even knowing that someone has gained unauthorized access to the network. The hacker may use the captured device as an additional attack platform to launch attacks on other connected devices. For example, the hacker may use an infected smart TV as part of a botnet to infect more devices. As a result, the majority of small local area networks and home networks may be incredibly insecure. Consequently, users may suffer serious damages from security attacks, including loss of revenue, breach of confidentiality, system failure, data corruption, damage to reputation and other potential loss.

SUMMARY

For the aforementioned reasons, there is a need for an automated network policy management system that is able to define the policies and restrictions for electronic devices within a local area network automatically and secure the local area network in a robust way without requiring any professional information technology knowledge from a user. Discussed herein are systems and methods for determining communication protocols for an electronic device based on the device identifier, determining electronic communication protocol restrictions for the local area network, monitoring data traffic and notifying the user with an alert regarding unusual data traffic that does not satisfy the communication protocol restrictions, updating the electronic communication protocol restrictions by learning from the network data traffic and user's instruction, and improving network security by applying adjustments accordingly.

In one embodiment, a method comprises receiving a request from a first electronic device to connect to a first network and determining an electronic communication protocol of the first electronic device based on a unique electronic identifier of the first electronic device. The method also comprises querying a database to identify a pre-determined electronic communication protocol restriction value corresponding to the electronic communication protocol of the first electronic device and connecting the first electronic device to a subnetwork, the subnetwork corresponding to any electronic device with an electronic communication protocol restriction value that satisfies a threshold. The method also comprises continuously monitoring data traffic from the first electronic device comprising data packets transmitted from the first electronic device to a second network and a second electronic device within other subnetworks, and, upon identifying at least one data packet transmitted from the first electronic device to the second network not satisfying the electronic communication protocol restriction value, terminating the connection between the first electronic device and the second network. The method also comprises upon identifying at least one data packet transmitted from the first electronic device to the second electronic device, terminating the connection between the first electronic device and the second electronic device.

In another embodiment, a system is configured to receive from a first electronic device to connect to a first network; determine an electronic communication protocol of the first electronic device based on a unique electronic identifier of the first electronic device; query a database to identify a pre-determined electronic communication protocol restriction value corresponding to the electronic communication protocol of the first electronic device; connect the first electronic device to a subnetwork of the first network, the subnetwork corresponding to any electronic device with an electronic communication protocol restriction value that satisfies a threshold; continuously monitor data traffic from the first electronic device comprising data packets transmitted from the first electronic device to a second network and a second electronic device within other subnetworks; upon identifying at least one data packet transmitted from the first electronic device to the second network not satisfying the electronic communication protocol restriction value, terminate the connection between the first electronic device and the second network; and upon identifying at least one data packet transmitted from the first electronic device to the second electronic device, terminate the connection between the first electronic device and the second electronic device.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
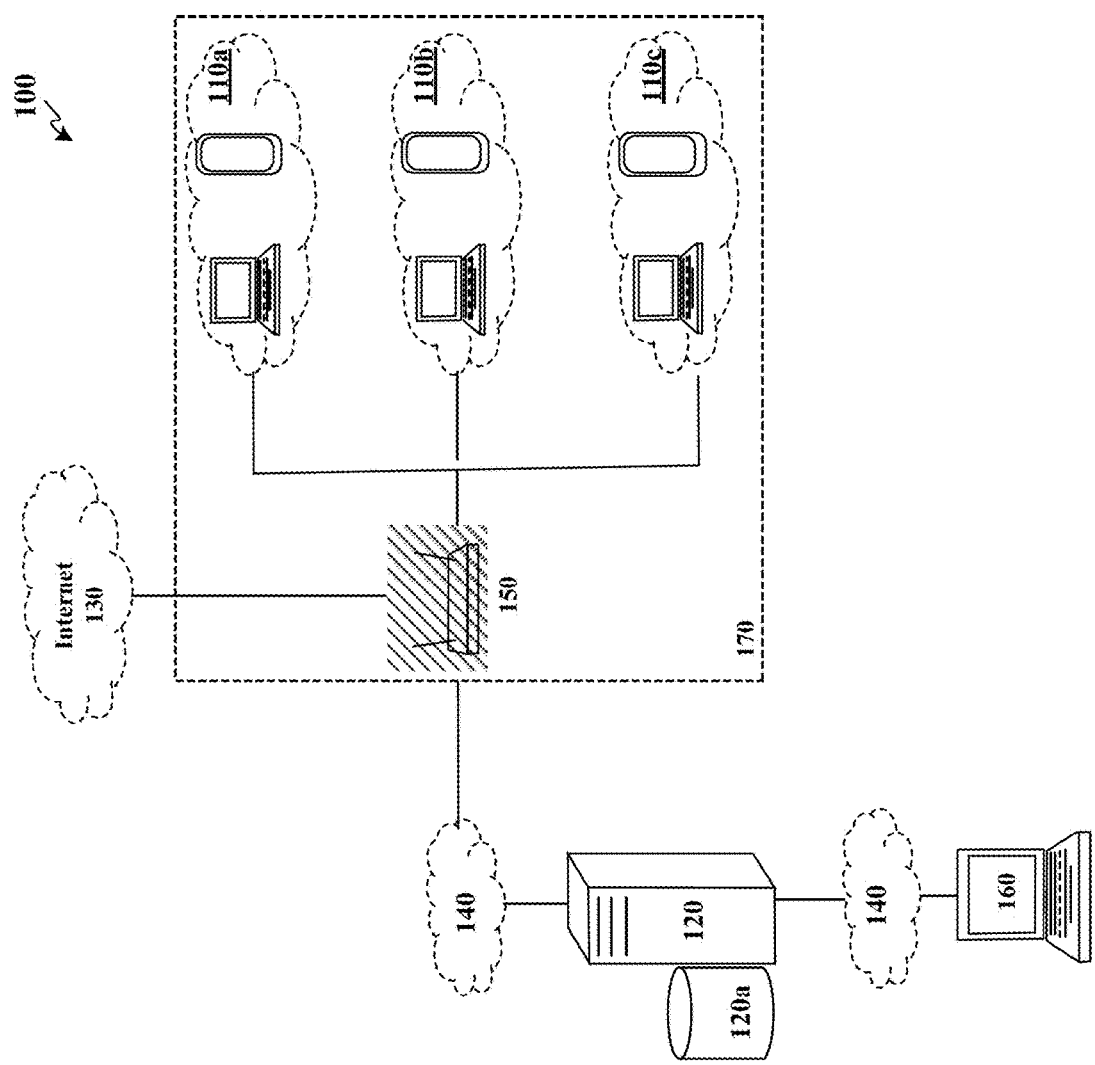
FIG. 1 illustrates a computer system for automated network policy management, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for automated network policy management, according to an embodiment. The system 100 may comprise a set of electronic devices 110a-110c connected to a router 150 in a local area network 170, an analytic server 120 with a restriction database 120a, and an electronic client device 160. The electronic client device 160 may be connected to the analytic server 120 via hardware and software components of one or more networks 140. The local area network 170 may be connected to a public network 130 (e.g., Internet) via the router 150. For example, the local area network may be a home network with a set of home appliances, and the home network may be connected to the Internet via the router. Further, the analytic server 120 may be connected to the router 150 via the network 140. The analytic server 120 may manage the data traffic of the electronic devices 110a-110c via the router 150. For example, the analytic server 120 may manage the data traffic within the local area network 170 and the data traffic between the local area network 170 and the public network 130. The public network 130 may be any network accessible by the public (e.g., Internet). To protect the security of local area network 170 from attacks from the public network 130, the analytic server 120 may establish electronic communication protocol restrictions including communication policies and access rules for the electronic devices 110a-110c in the restriction database 120a. The analytic server 120 may comprise, or may be in networked-communication with a restriction database 120a.

In some embodiments, the network 140 and the public network 130 may be the same network. However, communication over the network 140 may require authentication and authorization. For example, the communication may require machine-to-machine authentication, such as x.509 certificate based authentication to authorize machine interactions on both wired and wireless networks and enable computers and other machines to interact and exchange information autonomously. Examples of the network 140 may include, but are not limited to, Local Area Network (LAN), Wireless Local Area Network (WLAN), metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), Internet Engineering Task Force (IETF) specifications such as TLS, through a Virtual Private Network (VPN) tunnel, and IEEE communication protocols. In some other embodiments, the network 140 and the public network 130 may be different networks. For example, the network 140 may be a private network, and the public network 130 may be a public network.

Because the network 130 has vast reach and accessible by the public, it may pose security threats on the local area network 170. To prevent the local area network 170 from attacks from the public network 130, the analytic server 120 may manage the electronic devices 110a-110c within the local area network 170. Specifically, the analytic server 120 may manage the set of electronic devices 110a-110c by segmenting the electronic device 110a-110c into different subnetworks. A subnetwork may be a subset of electronic devices connected with each other based on a set of rules. For example, the electronic devices 110a are within a first subnetwork, the electronic devices 110b are within a second subnetwork, the electronic devices 110c are within a third subnetwork. Different subnetworks may be isolated from each other. The set of electronic devices 110a-110c may be part of an Internet of thing (IoT) within a local area network. For example, the set of electronic devices may be smart devices in a house. The analytic server 120 may segment the home network into multiple subnetworks and determine an assigned subnetwork for each electronic device connected to the home network.

The analytic server 120 may be any computing device comprising a processor and other computing hardware and software components, configured to manage network traffic based on network policy, process the requests received from the electronic client device 160 and provide various services for the user through a graphical user interface on the electronic client device 160 operated by the user. The analytic server 120 may be logically and physically organized within the same or different devices or structures, and may be distributed across any number of physical structures and locations (e.g., cabinets, room, buildings, and cities).

The analytic server 120 may determine electronic communication protocol restrictions including access rules and communication policies for each electronic device 110a-110c within the local network, and restrict access from the local network (e.g., home network) to public network 130, such as the Internet. The analytic server 120 may monitor the data traffic of the local area network 170 via the router, identify unusual data traffic based on the access rules and communication policies in the restriction database 120a, and alert the user regarding unusual data traffic by sending an alert notification to the electronic client device 160. The analytic server 120 may learn new access rules and communication policies from the user's instructions and other local area networks using machine-learning techniques, and update the electronic communication protocol restrictions in the restriction database 120a with the new access rules and communication policies.

The electronic devices 110a-110c may be any computing device of the Internet of things (IoT) comprising a processor, memory, power resources to perform various tasks, and network connectivity that enables the electronic device to connect and exchange data with other electronic devices. For example, the electronic devices may be any physical devices, home appliances, and other items embedded with electronics, software, sensors, and network connectivity. Each electronic device 110a-110e is uniquely identifiable through its embedded computing system but is also to inter-operate within the existing Internet infrastructure.

In the home network, the electronic devices 110a, 110b may be smart devices of lighting, heating (such as smart thermostats), ventilation, air conditioning (HVAC), and security, as well as home appliances such as washer/dryers, ovens or refrigerators/freezers. In addition, the electronic devices 110a-110b connected to a home network may also include, but are not limited to, a desktop computer; a laptop, a personal digital assistant (PDA), a smartphone, a tablet computer, a smart watch, and the like. Such devices, when remotely monitored and controlled via the Internet, are an important constituent of the Internet of Things. The IoT technology allows objects to be sensed or controlled remotely across existing network infrastructure, which creates opportunities for more direct integration of the physical world into computer-based systems, and results in improved efficiency, accuracy and economic benefit in addition to reduced human intervention.

The router 150 may be any networking device configured to perform data traffic directing functions. In one or more embodiments, the router 150 may be a smart router for automated network policy management. The router 150 may be connected to the analytic server 120 and perform data traffic directing functions based on the instructions from the analytic server 120.

The electronic client device 160 may be any computing device comprising a process/microcontroller and/or any other electronic component that allows a participant/user to interact with analytic server 120 and perform the various tasks and processes described herein. The examples of the electronic client device 160 may include, but are not limited to, a desktop computer, a laptop, a personal digital assistant (PDA), a smartphone, a tablet computer, and the like.

The electronic client device 160 may execute an Internet browser or local application that accesses the analytic server 120 in order to issue requests or instructions. The electronic client device 160 may transmit credentials from user inputs to the analytic server 120, from which the analytic server 120 may authenticate the user and/or determine a user's role. If the user is a new user who has not registered, the electronic client device 160 may transmit registration requests to the analytic server 120. The registration requests may include the user's identification information and other information that is required by the analytic server 120 for new user registration. The analytic server 120 may generate an account for the user, and save the user's identification information and other required information to a profile database. The electronic client device 160 may comprise any number of input devices configured to receive any number of data inputs, including various types of data inputs allowing for authentication (e.g. username, password, certificates, and biometrics).

The electronic client device 160 may be configured to communicate with the analytic server 120 through one or more networks 140, using wired and/or wireless communication capabilities. In operation, the electronic client device 160 may execute a program, which may include a graphical user interface (GUI) that renders an interactive layout, schematic, or other elements for the user to input a request. For example, the user may include a text-based interface allowing the user to enter manual commands.

The analytic server 120 may interact with the electronic client device 160 via a graphical user interface (GUI). The analytic server 120 may provide a GUI for the user when the user tries to add a new electronic device into an existing local area network. For example, the GUI may include network map showing subnetworks of the local area network and the corresponding electronic devices within each subnetwork. The GUI may allow the user to place the new electronic device into a designated subnetwork, and organize the local area network by dragging and dropping an electronic device from one subnetwork to another subnetwork. In addition, the analytic server 120 may provide an alert notification GUI when the analytic server 120 determines monitored data traffic of the electronic devices 110a-110c is unusual and may pose a threat to the network security. For example, the analytic server 120 may send an alert notification to the electronic client device 160. The alert notification may include one or more graphical interactive components that allow the user to indicate the data traffic status and give instructions. For example, the user may indicate the data traffic is normal and allow the data traffic by clicking on a corresponding button on the GUI.

The restriction database 120a may be any non-transitory machine-readable media configured to store data. The restriction database 120a may include electronic communication protocol restrictions comprising assigned subnetwork, access rules, communication protocols for each electronic device and communication policies, data traffic patterns, connectivity restrictions for communication within the local area network and/or communications between the local area network and the public network. The restriction database 120a may include any other related information that may help the analytic server 120 manage the network security. The analytic server 120 may query the restriction database 120a for communication protocols for an electronic device. The communication protocols may comprise a set of rules on the access control, port functions, privacy requirements, and electronic file types communicated from the electronic device and other related information. For example, the communication protocols may include information on, if an electronic device is a printer or a TV, the type of data packets from the electronic devices, the port numbers corresponding to particular data packets, and the like. The analytic server 120 may further query the restriction database 120a for the communication protocol restrictions that may define the access rules and connectivity restrictions of the local area network to determine an assigned subnetwork for the electronic device and determine whether data traffic is malicious. The analytic server 120 may update the restriction database 120a with new electronic communication protocol restrictions learned from the network.

Figure 2:
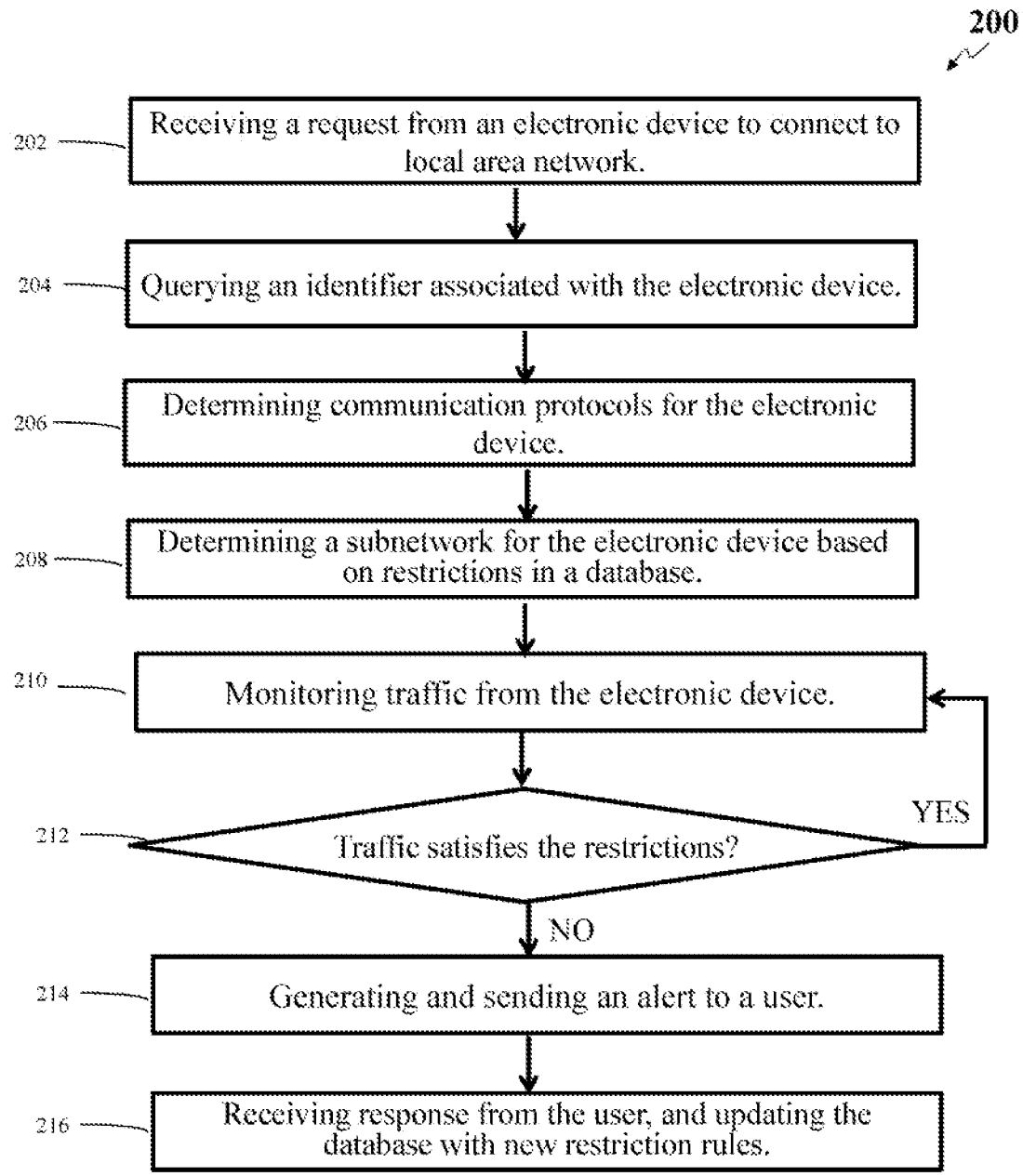
FIG. 2 illustrates a flowchart depicting operational steps for automated network policy management, according to an embodiment.

FIG. 2 illustrates execution of a method 200 for automated network policy management, according to an embodiment. One having ordinary skill in the art would appreciate that other embodiments may comprise additional or alternative steps, or may omit some steps altogether.

At step 202, the analytic server may receive a request from an electronic device to connect to the local area network via a router. A user may connect a new electronic device to an existing local area network. For example, the electronic device may be a smart refrigerator requesting to connect to a home network via the router. The analytic server may receive the request using wired or wireless technologies.

At step 204, the analytic server may query a unique electronic identifier associated with an electronic device when receiving a request from the electronic device to join a local area network. Specifically, the analytic server may query the media area access (MAC) of the electronic device. The MAC address of a device is a unique identifier assigned to network interfaces for communications at the data link layer of a network segment. MAC addresses are most often assigned by the manufacturer of a network interface controller and are stored in the hardware. If assigned by the manufacturer, a MAC address usually encodes the manufacturer's registered identification number.

At step 206, the analytic server may determine the communication protocols for the electronic device. For example, in a home network, the analytic server may determine communication protocols for an electronic device when the electronic device is connected to the home network. The analytic server may determine the communication protocols for the electronic device based on the MAC address. Because a MAC address may include information on the manufacturer and properties of the electronic device, the analytic server may be able to determine the functions, tasks, and operations of the electronic device. For example, the analytic server may determine an electronic device is a smart refrigerator or a camera based on its respective MAC address. The analytic server may further determine the corresponding communication protocols, including access control, port functions, privacy requirements, and electronic file types. For example, the rules on data traffic from a smart refrigerator and the data traffic from a camera may be different, and the analytic server may know the difference on the data traffic pattern, the access control, the electronic file type, and other rules of communication protocols.

In some embodiments, the analytic server may query the restriction database to determine communication protocols associated with a particular electronic device. The restriction database may include data on the type of MAC addresses and the corresponding communication protocols. The analytic server may query a third-party network to obtain the related information for a certain MAC address. The analytic server may also access the producer's electronic specification by web crawling and scanning external databases. The analytic server may store communication protocols obtained from third-party networks and external databases into the restriction database. For example, the analytic server may identify the producer of the electronic device, the functions and properties of the electronic device based on the MAC address. The analytic server may search and scan the web pages containing the identified information of the electronic device with web-crawling techniques.

At step 208, the analytic server may determine a subnetwork for the electronic device based on pre-determined electronic communication protocol restrictions and connect the electronic device to the subnetwork. The restriction database may include the pre-determined electronic communication protocol restrictions, which may comprise a set of rules restricting one or more data packets of the electronic device being transmitted within the local area network and to the public network or to any other electronic device connected to the private network. The electronic communication protocol restrictions may comprise rules on connectivity requirements of the electronic devices based on functions, access control requirement, privacy requirements, communication protocols, and other rules. For example, the electronic communication protocol restrictions may include rules that define a smart refrigerator should not communicate with a camera, although they are both within the local area network. As another example, the electronic communication protocol restrictions may include rules that define a smart refrigerator should not communicate with a web server of the public network that is located out of the United States.

The electronic communication protocol restrictions may also include data traffic patterns specific to each electronic device corresponding to the activities and operations the electronic device performs. In some embodiments, the electronic communication protocol restrictions may include rules considering the user's location and the time of the data traffic. For example, in a home network, when the user is not at home, the data traffic from the user's laptop should be less than a threshold. In another example, the data traffic from the user's laptop should be less than a threshold when the time is past midnight. The user may be able to configure the electronic communication protocol restrictions by interacting with a graphical user interface. For example, the analytic server may provide a GUI to allow the user to set restriction rules and threshold values based on the user's requirements.

The analytic server may query the restriction database to obtain the electronic communication protocol restrictions and segment the local area network into multiple subnetworks based on the electronic communication protocol restrictions. A network zone (e.g., a subnetwork) may comprise a subset of electronic devices of the local area network. Different network zones are isolated from each other. The electronic devices from a first subnetwork may not be able to communicate with the electronic devices from a second subnetwork. Each electronic device within the same subnetwork may have a restriction value satisfying the connectivity requirement or threshold of the corresponding subnetwork. For example, one subnetwork may include electronic devices having full access to the public network and the local area network. Another subnetwork may include electronic devices having limited access to public network.

In some embodiments, the subnetworks may be dynamic, and the analytic server may move an electronic device from one subnetwork to another subnetwork based on the operations of the electronic device. In operation, the analytic server may generate a graphical user interface on an electronic client device operated by a user to allow the user to configure the subnetwork for each electronic device. For example, the graphical user interface may include a network map showing the subnetworks and the corresponding electronic devices within each subnetwork. The user may be able to organize the subnetworks by dragging and dropping an electronic device from one subnetwork to another subnetwork.

By segmenting the local area network into multiple isolated subnetworks, the analytic server may improve the network security by allowing each electronic device to only communicate with certain devices they are configured to. In some embodiments, the analytic server may set rules on allowed ports and protocols for each electronic device. For example, when the analytic server determines that an electronic device should only use certain ports for communication, the analytic server may only open such ports, while blocking the other ports automatically. As a result, the electronic device may only be able to communicate with certain devices through the open ports.

At step 210, the analytic server may monitor the data traffic from the electronic devices. The analytic server may monitor the data traffic within the local area network and the data traffic between the local area network and the public network.

At step 212, the analytic server may determine whether the monitored data traffic satisfies the electronic communication protocol restrictions. In some embodiments, the analytic server may determine the monitored data traffic is unusual when the monitored data traffic does not satisfy the electronic communication protocol restrictions. As discussed above, the electronic communication protocol restrictions comprise a set of rules restricting one or more data packets of the electronic device being transmitted within the local area network and to the public network. The electronic devices from a first subnetwork may not be able to communicate with the electronic devices from a second subnetwork. In addition, some electronic devices may not be able to communicate with the public network. When an electronic device transmits data packets to other devices that do not satisfy the electronic communication protocol restrictions, the analytic server may determine the data packets are unusual data traffic or a potential threat to the network security.

As discussed above, the electronic communication protocol restrictions may include data traffic patterns specific to each electronic device and access rules and connectivity rules for each electronic device. When the data traffic from an electronic device is not consistent with the electronic communication protocol restrictions, the analytic server may determine the data traffic of the electronic device is a potential threat to the network security. For example, when the analytic server detects a large amount of data traffic (e.g., larger than a threshold) from a TV within the home network, the analytic server may determine the data traffic is unusual considering the homeowner is not at home based on the location of the homeowner's smart phone.

When the analytic server determines the data traffic is not consistent with the electronic communication protocol restrictions, the process may proceed to step 214. Otherwise, the analytic server may determine the data traffic is normal, and the process may proceed to step 210 to continue monitoring the data traffic from the electronic devices.

At step 214, the analytic server may generate an alert notification to notify the user regarding the unusual data traffic. The alert notification may include information of the inconsistency between the monitored data traffic and the electronic communication protocol restrictions. The analytic server may notify the user by sending the alert notification to the electronic client device and request the user to reply to the alert notification. For example, the analytic server may generate a graphical user interface displayed on the electronic client device. The graphical user interface may include the inconsistency information and one or more graphical interactive components. The user may give instructions by interacting with the one or more graphical interactive components. For example, the user may indicate whether the data traffic is normal or malicious by interacting with the graphical user interface of the alert notification. The analytic server may take proper actions based on the user response. For example, the analytic server may allow the communication for normal data traffic and terminate the connection by blocking communication for malicious data traffic.

The analytic server may send the alert notification in the form of text message, instant message, email, voicemail, or any other electronic message. The analytic server may indicate the inconsistency information in plain language. For example, instead of demonstrating a set of script code from a firewall log that includes numbers and characters (e.g., IP address, MAC address, and ports), the alert notification may tell the user that there is a large amount of data packet exchange between the user's TV and a specific website. As a result, users without professional knowledge may be able to make a decision on the status of the data traffic and respond to the alert notification.

At step 216, the analytic server may receive responses from the user and update the electronic communication protocol restrictions in the restriction database with new restriction rules learned from the network. In some embodiments, the analytic server may learn from the user's instructions on the data traffic status for a data traffic pattern. For example, when the user indicates a data traffic pattern is malicious for a number of times (e.g., a threshold value), the analytic server may learn that such data traffic pattern is malicious. The analytic server may block the data traffic next time the same data traffic pattern is identified without triggering an alert notification. Alternatively, the analytic server may learn an unusual data traffic pattern is actually normal after the user indicates normal status for a number of times. The analytic server may modify the electronic communication protocol restrictions by updating the corresponding rules. For example, in the example of notifying the user of the large amount of data packet exchange between the TV and the specific website, the user may indicate the data traffic is normal since the data traffic is for system updating. After a certain times, the analytic server may learn that such data traffic from the specific website is normal. The analytic server may update the electronic communication protocol restrictions in the restriction database by adding the website address into a list of allowed addresses.

In some other embodiments, the analytic server may learn from other local area networks. For example, different analytic servers associated with different local area networks may communicate with each other periodically, and exchange the electronic communication protocol restrictions including access rules, communication policies, and the data traffic status on the data traffic patterns from each local area network. In some embodiments, when an analytic server detects malicious data traffic pattern from one local area network, the analytic server may notify other analytic servers immediately regarding the malicious data traffic pattern. Alternatively, the analytic server may manage a plurality of local area networks, and the analytic server may learn from the plurality of local area networks. For example, the analytic server may apply new restriction rules learned from one local area network to other local area networks.

The analytic server may learn the electronic communication protocol restrictions from network by using machine-learning algorithms. Examples of machine learning algorithms may include, but are not limited to, decision trees, naive Bayes classifiers, ordinary least squares regression, logistic regression, support vector machines, ensemble methods, clustering algorithms, principal component analysis, singular value decomposition, and independent component analysis.

By learning from the network and updating the electronic communication protocol restrictions dynamically, the analytic server may apply adjustments accordingly and improve network security. In a trusted network, the data packet exchange may be more efficient by allowing caching of wide area network traffic and data exchange within a geographical area. Different home networks within the same geographical area may be able to share data with each other. For example, since a home network is trusted, the data stored or cached in the electronic devices within such a home network may be shared with other neighbor home networks. When a neighbor tries to download a movie, the neighbor may not need to go to the public network, but directly access the movie from a trusted home network within the neighborhood. Thus, secure local area networks may help lower the load on Internet service providers (ISP), reduce network congestion and improve the perceived performance of Internet sites and other data throughput.

Figure 3A:
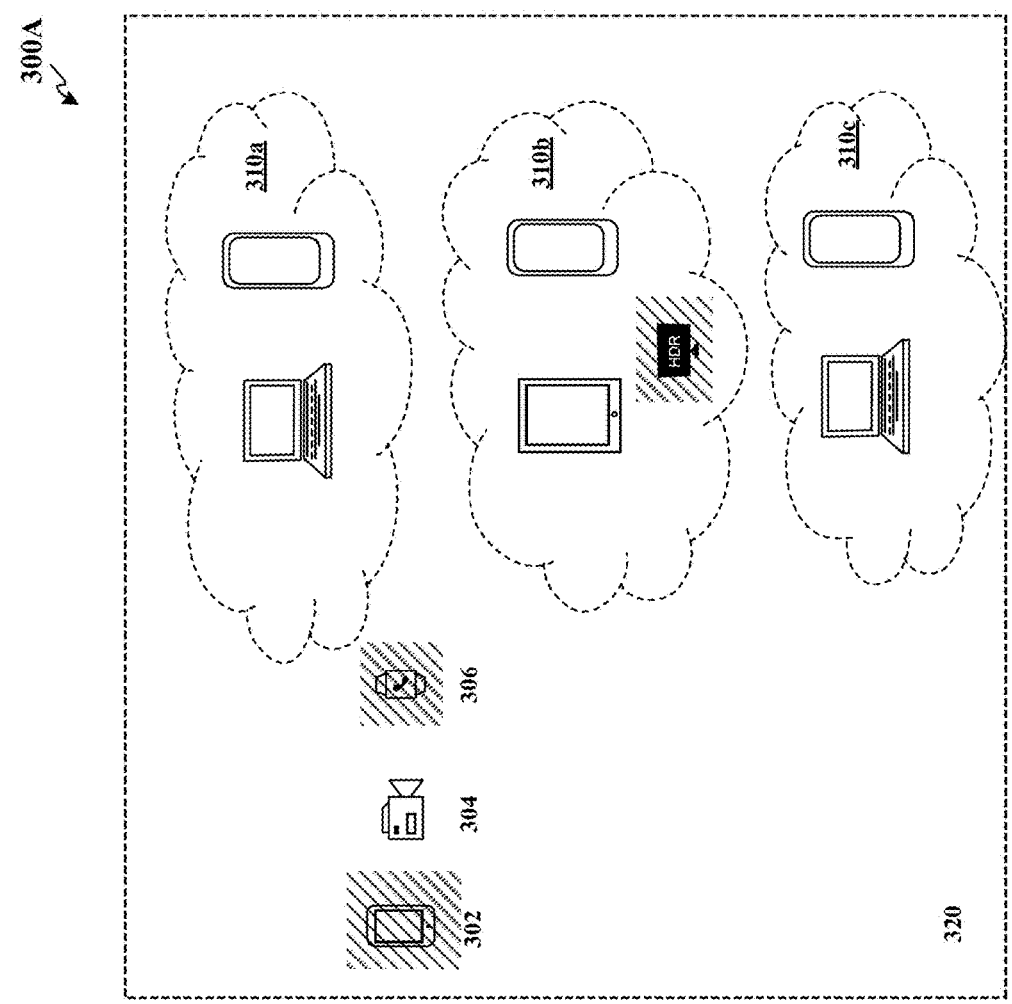
FIGS. 3A-3C illustrate graphical user interfaces for configuring a local area network, according to an embodiment.
Figure 3B:
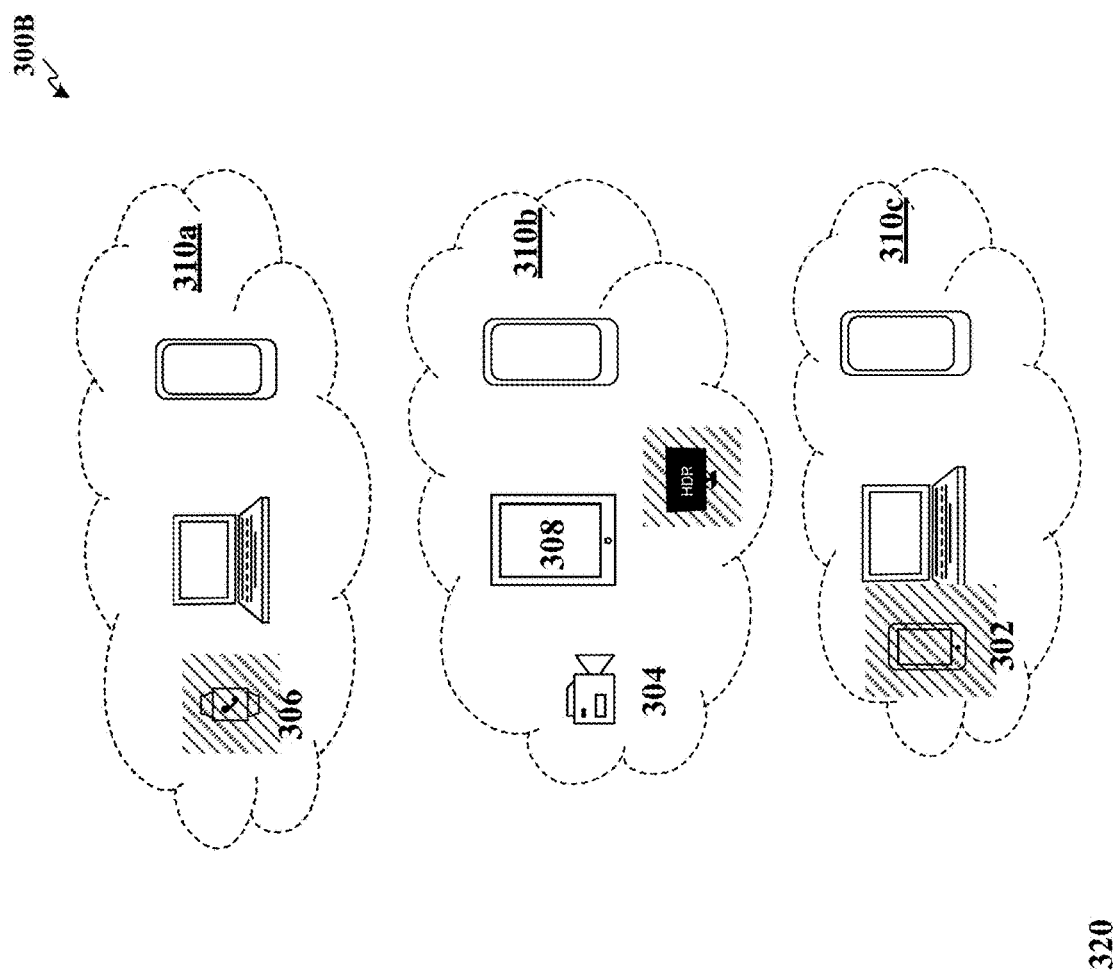
Figure 3C:
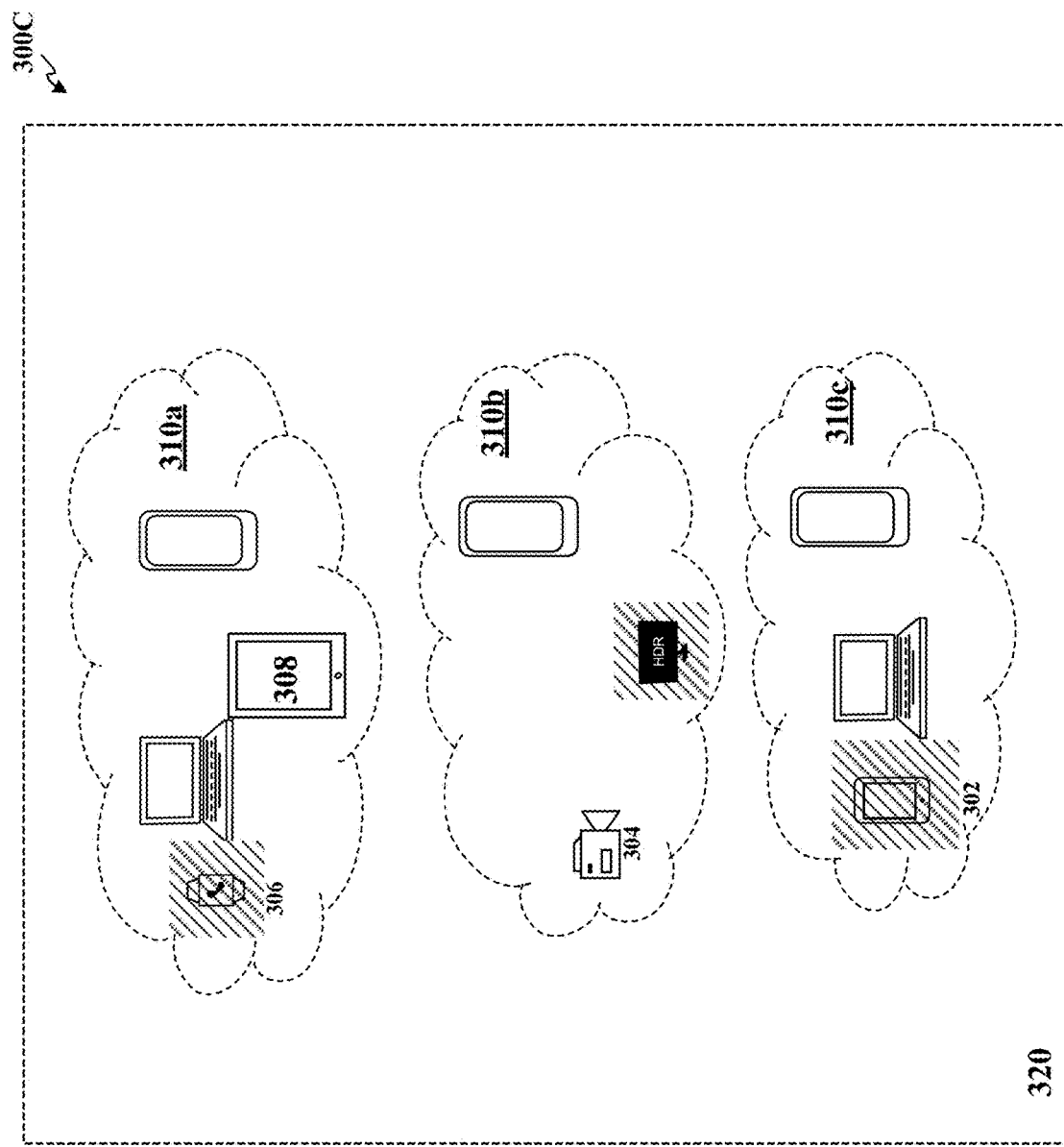

FIGS. 3A-3C illustrate an example of graphical user interfaces for configuring a local area network, according to an embodiment. The analytic server may provide a GUI 300A (shown in FIG. 3A) for the user when the user tries to add new electronic devices 302, 304, 306 into the local area network 320. For example, the GUI may include network map showing subnetworks 310a, 310b, 310c of the local area network 320 and the corresponding electronic device within each subnetwork. The GUI 300A may allow the user to place the new electronic devices 302, 304, 306 into a designated subnetwork by dragging and dropping the electronic devices 302, 304, 306.

The user may place the electronic devices 302, 304, 306 into a designated subnetwork based on the communication protocols of the electronic devices and the communication protocol restrictions of each subnetwork 310a, 310b, 310c. For example, the local area network may be 320 a home network. The subnetwork 310a may comprise the family members' mobile devices and computers that can communicate and share data with each other. For instance, the user may want his/her personal devices to be connected with each other in subnetwork 310a, so that the user can review messages or documents across different devices and/or answer a phone call from a laptop. The subnetwork 310b may be a network zone for a set of home appliances. The subnetwork 310c may be a network zone for guest devices.

The GUI 300B (shown in FIG. 3B) may show the network map after the user places each new electronic devices 302, 304, 306 into a designated subnetwork. Specifically, the user may determine that the electronic device 302 is a guest mobile phone, and place the electronic device 302 into the subnetwork 310c. The user may determine the electronic device 304 is a camera, which can communicate with the TV and other devices for surveillance purposes in subnetwork 310b. The user may determine the electronic device 306 is a smart watch and should be able to communicate with other personal devices in subnetwork 310a. As shown in GUI 300B, the user may place the electronic device 302 into subnetwork 310c, place the electronic device 304 into subnetwork 310b, and place the electronic device 306 into subnetwork 310a.

In addition, the GUI may allow the user to dynamically organize the subnetworks by dragging and dropping an electronic device from one subnetwork to another subnetwork. For example, the electronic device 308 may be a tablet computer and may be originally in subnetwork 310b as a device for surveillance purposes as shown in FIG. 3B. The user may determine that the user needs the electronic device 308 for personal use. The user may want the electronic device 308 to be able to share data with the user's other personal devices. As a result, the user may drag and drop the electronic device 308 from subnetwork 310b into subnetwork 310a, as shown in GUI 300C (in FIG. 3C).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    receiving a connection request from a first electronic device to connect to a first network;
    in response to the connection request, determining an electronic communication protocol of the first electronic device based on a unique electronic identifier of the first electronic device;
    querying a database to identify a pre-determined electronic communication protocol restriction value corresponding to the electronic communication protocol of the first electronic device;
    connecting the first electronic device to a subnetwork among a plurality of subnetworks, wherein the plurality of subnetworks are isolated from each other, the subnetwork corresponding to any electronic device with an electronic communication protocol restriction value that satisfies a threshold;
    continuously monitoring data traffic from the first electronic device comprising data packets transmitted from the first electronic device to a second network and a second electronic device within other subnetworks;
    upon identifying at least one data packet transmitted from the first electronic device to the second network not satisfying the electronic communication protocol restriction value, terminating the connection between the first electronic device and the second network;
    upon identifying at least one data packet transmitted from the first electronic device to the second electronic device, terminating the connection between the first electronic device and the second electronic device;
    generating an alert notification comprising information on the monitored data traffic not satisfying the electronic communication protocol restriction value;
    sending the alert notification to an electronic client device operated by a user;
    receiving a response from a user regarding a traffic status of the monitored data traffic, wherein the traffic status indicates whether the data traffic is malicious or normal; and
    updating the database with new electronic communication protocol restriction value obtained from the monitored data traffic and traffic status using machine learning algorithms.

2. The method of claim 1, wherein the unique electronic identifier is a media access control address.

3. The method of claim 1, wherein the first network is a local area network, the second network is a public network.

4. The method of claim 1, comprising:
    updating the database with new electronic communication protocol restriction value generated based on the user's response.

5. The method of claim 4, comprising:
    sending the alert notification via one of email, text message, instant message, and voicemail.

6. The method of claim 4, comprising:
    blocking the data traffic when the response from the user indicates the traffic status is malicious.

7. The method of claim 1, comprising:
    determining allowed communication ports for the first electronic device based on the electronic communication protocol; and
    opening the allowed communication ports while blocking other communication ports.

8. The method of claim 1, comprising:
    notifying other servers to block traffic with particular traffic patterns identified as malicious.

9. The method of claim 1, comprising:
    generating a graphical user interface that allows a user to move the first electronic device into different subnetworks.

10. A system comprising a non-transitory computer-readable medium storing instructions that when executed by a processor are configured to:
    receive a connection request from a first electronic device to connect to a first network;
    based on the connection request, determine an electronic communication protocol of the first electronic device based on a unique electronic identifier of the first electronic device;
    query a database to identify a pre-determined electronic communication protocol restriction value corresponding to the electronic communication protocol of the first electronic device;
    connect the first electronic device to a subnetwork among a plurality of subnetworks, wherein the plurality of subnetworks are isolated from each other, the subnetwork corresponding to any electronic device with an electronic communication protocol restriction value that satisfies a threshold;
    continuously monitor data traffic from the first electronic device comprising data packets transmitted from the first electronic device to a second network and a second electronic device within other subnetworks;
    upon identifying at least one data packet transmitted from the first electronic device to the second network not satisfying the electronic communication protocol restriction value, terminate the connection between the first electronic device and the second network; and
    upon identifying at least one data packet transmitted from the first electronic device to the second electronic device, terminate the connection between the first electronic device and the second electronic device;

generate an alert notification comprising information on the monitored data traffic not satisfying the electronic communication protocol restriction value;
send the alert notification to an electronic client device operated by a user;
receive a response from a user regarding a traffic status of the monitored data traffic, wherein the traffic status indicates whether the data traffic is malicious or normal; and
update the database with new electronic communication protocol restriction value obtained from the monitored data traffic and traffic status using machine learning algorithms.

11. The system of claim 10, wherein the unique electronic identifier is a media access control address.

12. The system of claim 10, wherein the first network is a local area network, the second network is a public network.

13. The system of claim 10, wherein the system is configured to:
update the database with new electronic communication protocol restriction value generated based on the user's response.

14. The system of claim 13, wherein the system is configured to:
send the alert notification via one of email, text message, instant message, and voicemail.

15. The system of claim 13, wherein the system is configured to:
block the data traffic when the response from the user indicates the traffic status is malicious.

16. The system of claim 10, wherein the system is configured to:
determine allowed communication ports for the first electronic device based on the electronic communication protocol; and open the allowed communication ports while blocking other communication ports.

17. The system of claim 10, wherein the system is configured to:
notify other servers to block traffic with particular traffic patterns identified as malicious.

18. The system of claim 10, wherein the system is configured to:
generate a graphical user interface that allows a user to move the first electronic device into different subnetworks.

* * * * *